United States Patent [19]

Gugeler

[11] 4,083,631

[45] Apr. 11, 1978

[54] ANIMATED VISUAL EFFECT ADAPTOR FOR GATED STILL PICTURE PROJECTORS

[76] Inventor: William G. Gugeler, 200 S. Vance, Lombard, Ill. 60148

[21] Appl. No.: 703,793

[22] Filed: Jul. 9, 1976

[51] Int. Cl.[2] .......................... G09F 13/24; A63J 3/00; G03B 21/00

[52] U.S. Cl. ...................................... 353/120; 40/406; 272/8 P; 353/2; 353/122

[58] Field of Search ........................... 353/2, 120, 122; 272/8 P; 40/106.21

[56] References Cited

U.S. PATENT DOCUMENTS

| | | | |
|---|---|---|---|
| 3,039,356 | 6/1962 | Knittel | 350/5 |
| 3,738,036 | 6/1973 | Landsinger et al. | 353/2 |
| 3,843,244 | 10/1974 | Facchini | 353/2 |

*Primary Examiner*—Steven L. Stephan
*Attorney, Agent, or Firm*—Hill, Gross, Simpson, Van Santen, Steadman, Chiara & Simpson

[57] ABSTRACT

An animated visual effect device is carried by a support such as a platform from which the device may depend, the device being adapted to be received in the projection gate of a projector between the light source and the projection lens system of the projector for projection of visual effects produced in the operation of the device, the support carrying means such as a power source, compressor, or the like, for operating the device. Visual effects may be produced by bubbling of air through differently colored viscous fluid contained in generally laminal chambers disposed for successive passage therethrough of the projection illumination.

9 Claims, 7 Drawing Figures

Fig. 4
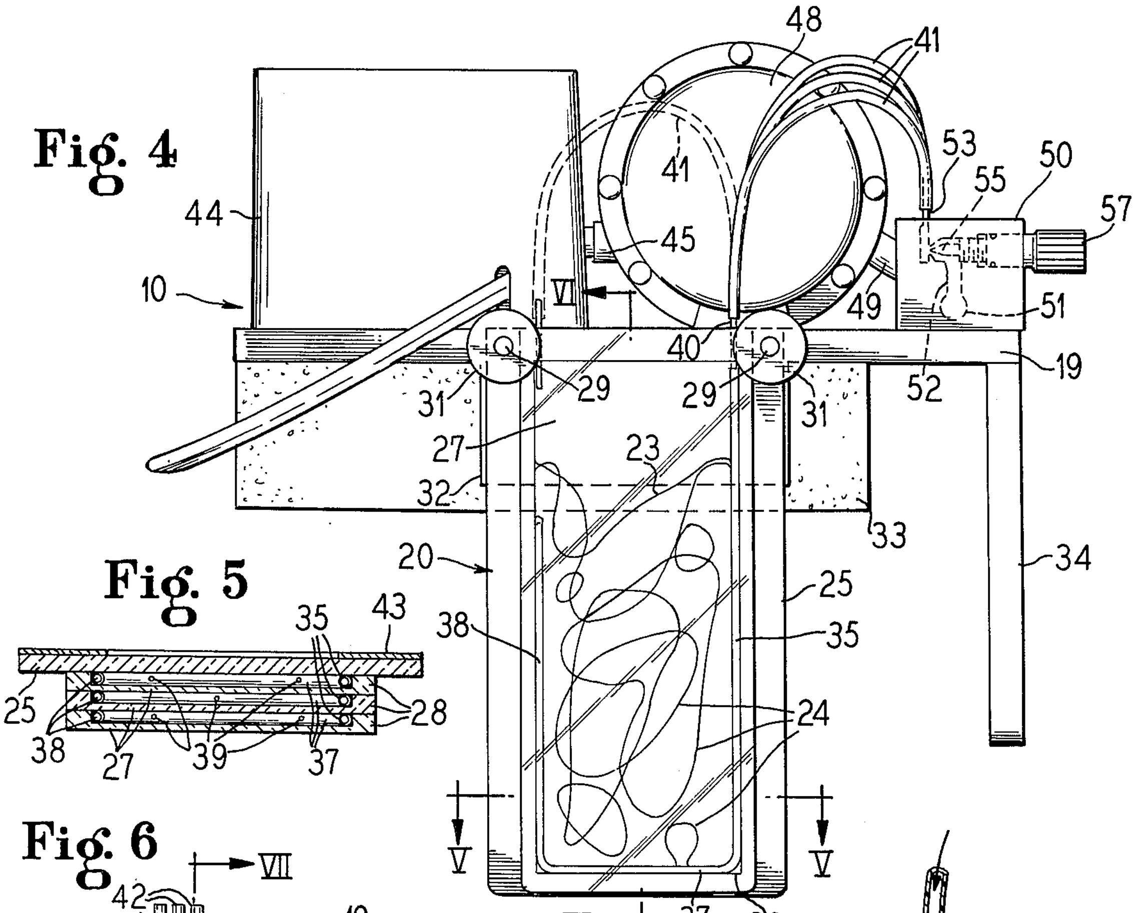
Fig. 5
Fig. 6
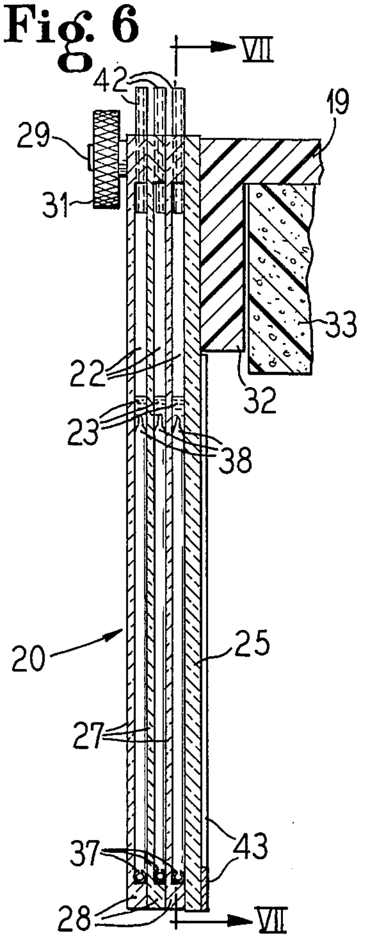
Fig. 7
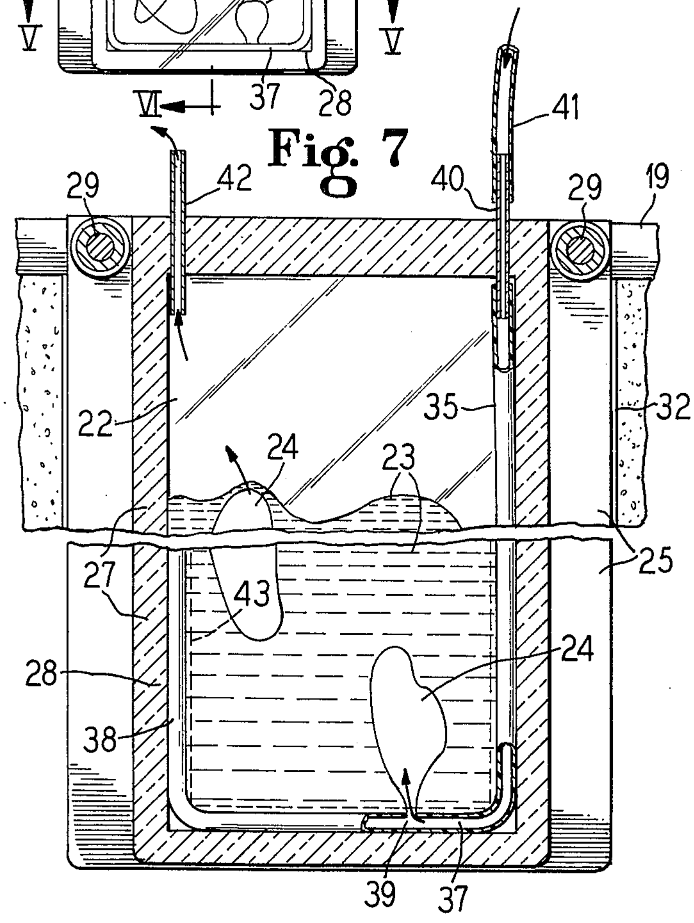

ANIMATED VISUAL EFFECT ADAPTOR FOR GATED STILL PICTURE PROJECTORS

This invention relates to new and improved means for producing attractive animated visual effects, and is more particularly concerned with a novel adaptor for gated still picture projectors.

Generally still picture projectors have gates for receiving slides or film strips, and such gates may also accommodate the supporting or guiding devices for the slides or film strips. However, the illumination from the light source behind the gate passing through the slide or film strip produces a still image as projected through the lens system in front of the gate.

I am aware that attachments have been proposed for still picture projectors to provide animated visual effects, utilizing the illumination source and the lens systems of the projectors, but a principal disadvantage of such proposals has been the necessity to dismantle the lens system or otherwise alter the projector in order to accommodate the animated effects device.

Accordingly, it is an important object of the present invention to overcome the disadvantages, deficiencies, inefficiencies, shortcomings, and problems in prior structures and to provide a new and improved animated visual effects adaptor for gated still picture projector taking advantage of the existing gate structure of the projectors and without requiring any alterations in the projector structures.

Another object of the invention is to provide a new and improved adaptor for the stated purpose having novel means for attaining variable animated visual effects.

According to features of the invention there is provided an animated visual effects adaptor unit for a conventional slide projector which has a top exterior horizontal surface through which a projection gate opens, the gate being between a light source and a projection lens system, the lens system projecting along a generally horizontal projection axis, the adaptor comprising a supporting platform adapted to be removably mounted on top of and substantially parallel to said horizontal top surface of the projector, a light permeable animated visual effect device carried by and movable with the supporting platform, the device comprising panel structure carrying a plurality of individual light beam projectable animated visual effects producing means, the panel structure extending downwardly from the supporting platform and being dimensioned to be received freely in the projection gate of the projector between said light source and the projection lens system when the platform is placed in position adjacent to said horizontal surface, for passage of light beam from the light source through all of said visual effects producing means for projection through the lens system of the projector of animated visual effects produced by operation of said visual effects producing means of the device, and means mounted on and movable with said supporting platform for operating each of said plurality of animated visual effects producing means of the device independently.

Where the device comprises laminate juxtaposed colored fluid chambers with air bubble producing means, the support-carried operating means may comprise an air compressor and associated mechanism. Means for variably controlling the bubble effects in the respective chambers may also be provided.

Other objects, features and advantages of the invention will be readily apparent from the following description of a representative embodiment thereof, taken in conjunction with the accompanying drawings although variations and modifications may be effected without departing from the spirit and scope of the novel concepts embodied in the disclosure and in which:

FIG. 4 is a front elevational view of the adaptor unit.

FIG. 5 is a horizontal sectional detail view taken substantially along the line V—V of FIG. 4.

FIG. 6 is a vertical sectional detail view taken substantially along the line VI—VI of FIG. 4. and FIG. 7 is a vertical sectional elevational detail view taken substantially along the line VII—VII of FIG. 6.

Figure 1:
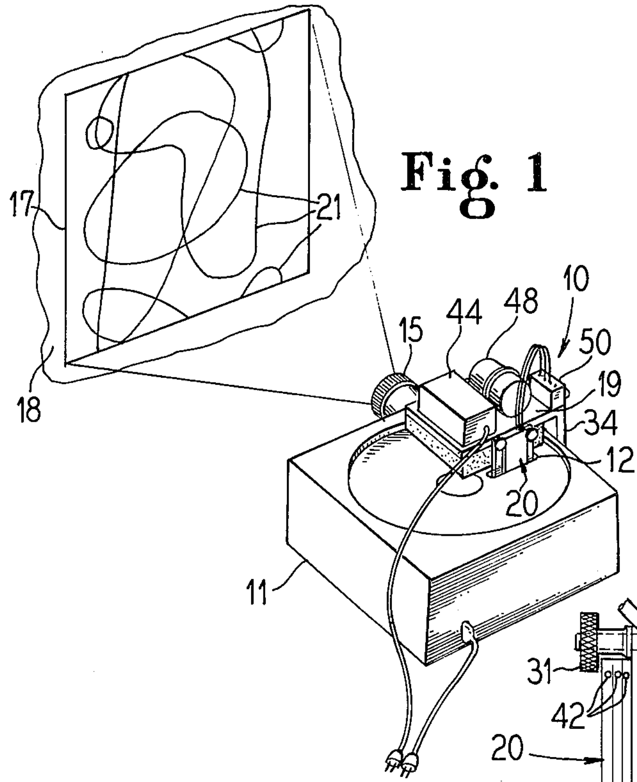
FIG. 1 is an isometric view exemplifying utility of the adaptor unit according to the present invention.
Figure 2:
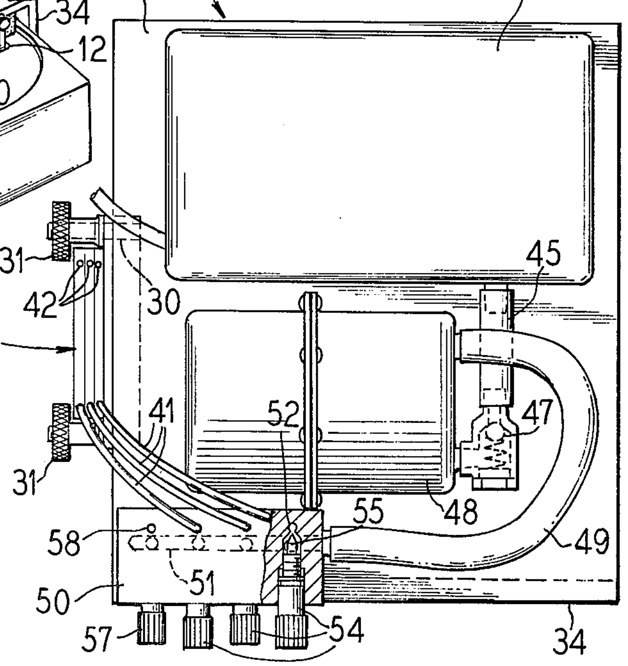
FIG. 2 is a top plan view of the adaptor unit.
Figure 3:
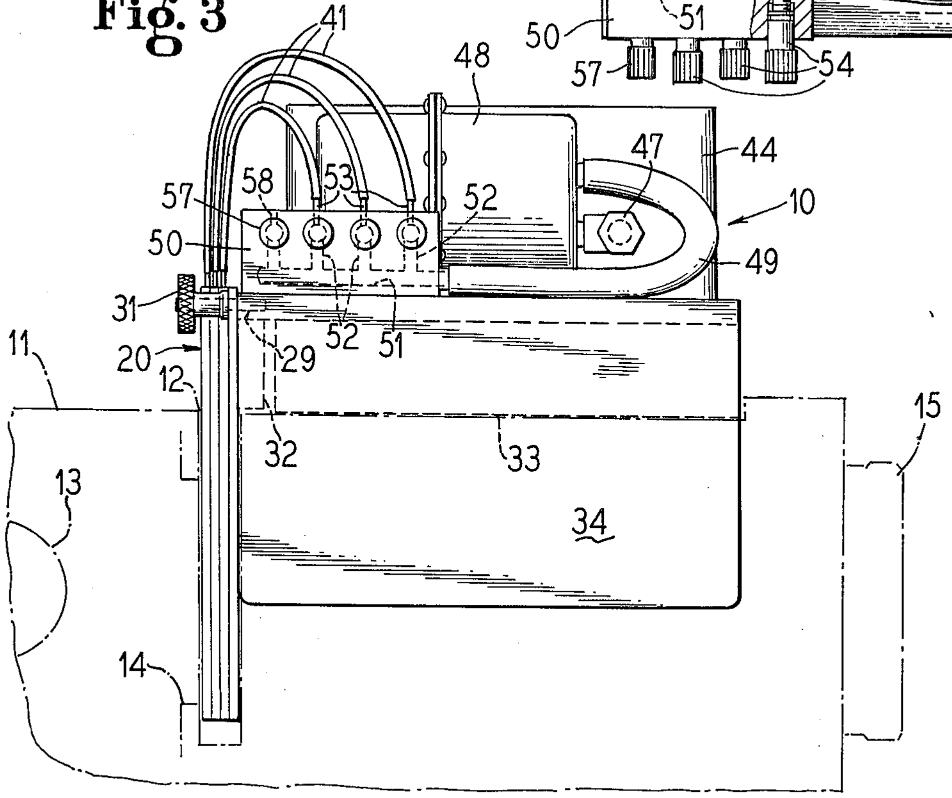
FIG. 3 is a side elevational view of the adaptor unit.

An adaptor unit 10 (FIGS. 1-4) is adapted to be used in conjunction with a still picture projector 11, and more particularly a slide projector having a slide receiving gate 12 (FIGS. 1 and 3) which, in the illustrated example, opens upwardly between a light source such as a projection lamp 13 located in the projector rearwardly from the gate 12 for projecting light through a suitable aperture 14 toward a lens system 15 extending forwardly relative to the film gate 12. An image 17 may thus be projected by the lens system 15 onto a screen 18 or other suitable surface such as a wall.

According to the present invention, the adaptor 10 comprises a support 19, conveniently in the form of a plate or panel which in effect, provides a platform from which depends a light permeable animated visual effect device 20 carried by the support 19 in such manner as to adapt it to be received in the projection gate 12 of the projector 11 for projection through the lens system 15 of visual effects 21 produced with the aid of the device 20.

In a preferred form, the device 20 is of the type adapted to produce constantly changing completely random multi-color effects in accordance with the principles of U.S. Pat. No. 3,706,149. For this purpose, the device 20 comprises a plurality of narrow chambers or fluid compartments 22 juxtaposed in laminar relation. Each chamber contains a preferably differently colored viscous fluid 23 (FIGS. 6 and 7) such as silicone through which bubbles 24 (FIGS. 4 and 7) are adapted to rise to produce constantly changing color effect combinations and images as projected onto the image area 17.

In a preferred construction, the device 20 comprises an assembly of transparent panels including a main backing panel 25 which may be of substantial self-sustaining thickness to which are secured in narrow gap relation a plurality, in this instance shown as three coextensive thinner chamber partition panels 27 having continuous marginal spacer and frame ribs 28 on one face and which are disposed in stacked relation with one another and with the back panel 25 and suitably hermetically sealed to provide the chambers 22. In this instance, the panels 27 are coextensive in length with the panel 25, but are narrower and laterally centered on the panel 25 to provide lateral wing areas on the panel 25 to facilitate removable attachment of the upper end portion of the assembly to the deck or platform support panel 19, which may be provided with suitable forwardly projecting studs 29 on its forward edge extending through respective holes 30 (FIG. 2) in the upper end portion of the panel 25 and onto which are detachably secured retainers such as thumb screws 31. It will be understood, of course, that the total width and thickness of the device 20 is such as to be received freely within the slot of the gate 12, and that the length of the device and the width of the chambers 22 is such as to present an ample projection area across the projection aperture 14 when the adaptor is mounted operatively in association with the projector 11. To provide a good backing support for the device 20, the support panel 19 desirably has a depending backing flange 32. To mount the panel 19 on the top of the projector 11 with sufficient clearance to accommodate the backing flange 32 and to provide a cushioned support, the underside of the panel 19 is equipped with a cushion 33 of preferably slightly greater thickness than the length of the flange 32. To assist in orienting the adaptor 10 relative to the upwardly opening gate 12, one side of the support panel 19 has a depending gauging flange 34, which in assembly with the projector 11 fits down along the side of the projector nearest the gate 12.

Each of the chambers 22 is equipped with means for introducing bubble generating fluid, which may be air, into one end, such as the lower end, of the chamber to move through the viscous liquid 23. Advantageously such fluid introducing means comprise respective small gauge plastic tubes 35 extending downwardly along one side of the chamber in each instance and having a manifold section 37 extending throughout the width of the bottom of the chamber and with a terminal closed end portion 38 of the tube extending upwardly along the opposite side as a stabilizing riser. Each of the manifold sections 37 of the air tubes 35 has one or a plurality of upwardly opening small fluid emitting ports 39 disposed in any preferred staggered or other orientation relative to one another in the several manifolds to produce a preferred bubble pattern upon introduction of fluid into the tubes 35. For introducing fluid such as air into each of the tubes 35, each tube is connected at its upper end to a coupling nipple pipe 40 projecting upwardly through the upper portion of the spacer frame 28 of the associated panel 27 and to which is connected a respective air tube 41. Air is adapted to escape from the upper end of each of the chambers 22 through a vent pipe 42 which is conveniently located to extend through the upper portion of the spacer frame rib 28 at the opposite side from the pipe 40 and with the inner end of the pipe 42 substantially spaced above the top level of liquid 23 in the chamber. In order to assure hiding of the tube 35 during projection, a masking strip 43 of suitable width is desirably applied to the outer face of the panel 25, as best seen in FIGS. 6 and 7.

For operating the animated visual effects producing means of the device 20, means are carried by the support platform panel 19 comprising fluid driving apparatus, suitably in the form of an electrically driven air compressor unit 44 which may be of the general type employed for aquarium aerating bubblers. The unit 44 is suitably permanently secured to the top of the support panel 19. Air pressure is conveyed from the compressor unit 44 through a duct 45 and a check valve 47 into an accumulator 48 mounted on the support panel 19 and from which the air is delivered through a duct 49 into a manifold 50 mounted on the support panel 19. In a preferred form, the manifold 50 is in the form of a block having a longitudinal manifold chamber 51 from which there are respective branches 52 communicating with nipples 53 projecting outwardly from the top of the manifold block and to which the air tubes 41 are respectively coupled by means of removable slip fit so that in the shipment or storage condition of the adaptor the air tubes 41 can be detached from the nipples 53 and slip fit coupled with the vent pipes 42 as shown in dash outline in FIG. 4 whereby to stopper the vent pipes 42 against leakage of liquid from within the chambers 22 should the unit be tilted on its side or upended.

In order to enable variations in bubble effect, means are provided for controlling the volume and/or pressure of the air introduced through the bubbling tubes 35. For this purpose, the manifold 50 is equipped with respective screw valves 54 which are adapted to be manipulated from outside the manifold and have valving tips 55 in control of the respective branches 52. In addition, a digitally manipulatable valve 57 carried by the manifold 50 controls a vent passage branch 58 from the manifold 51. Through this arrangement, any one of the branches 52 can be controlled by means of its valve 54 to permit more or less air volume to pass to its air tube 41 to attain a desired bubbling effect in the associated chamber 22. By closing the vent 58 all of the air pressure will be directed through the air tubes 41. If the vent 58 is cracked open to a desired extent, diminished air pressure may be delivered to all of the air tubes 41 proportionately to control the bubble effect desired. If spring biased plunger valves are substituted for the screw type digital valves 54 and 57, "playing" of the bubble effect may be provided for so as to modulate the projected visual effect as for example to accompany a musical background, or the like.

To mount the adaptor 10 on the projector 11, the visual effect device 20 is simply aligned with and dropped into the gate 12 and the cushioned support 19 rests on top of the projector. To remove the adaptor 10 it is simply lifted away. No alteration in the structure of the projector is necessary. All that need be done to adapt the projector 11 for the adaptor 10 is to remove or refrain from applying to the projector the usual slide tray. Of course, none of the slide control accessories or devices with which the projector may be equipped may be used when the adaptor 10 is used. However, when it is desired to switch to normal slide projection, the adaptor 10 is simply lifted away and the projector is immediately ready for slide projection operation.

It will be understood that variations and modifications may be effected without departing from the spirit and scope of the novel concepts of this invention.

I claim as my invention:

1. An animated visual effects adaptor unit for a conventional slide projector which has a top exterior horizontal surface through which a projection gate opens, said gate being between a light source and a projection lens system, said lens system projecting along a generally horizontal projection axis, said adaptor comprising:

a supporting platform adapted to be removably mounted on top of and substantially parallel to said horizontal top surface of the projector;

a light permeable animated visual effect device carried by and movable with said supporting platform;

said device comprising panel structure carrying a plurality of individual light beam projectable animated visual effects producing means, the panel structure extending downwardly from the supporting platform and being dimensioned to be received freely in the projection gate of the projector between said light source and the projection lens system when the platform is placed in position adjacent to said horizontal surface, for passage of light beam from the light source through all of said visual effects producing means for projection through the lens system of the projector of animated visual effects produced by operation of said visual effects producing means of the device;

and means mounted on and movable with said supporting platform for operating each of said plurality of animated visual effects producing means of the device independently.

2. An adaptor according to claim 1, wherein said supporting platform carries a mounting cushion on its lower side and said cushion is engageable with said top surface of the projector.

3. An adaptor according to claim 1, wherein said supporting platform has depending gauging means along one side for opposing a side of the projector.

4. An adaptor according to claim 1, wherein said device is detachably secured to said panel structure of the supporting platform.

5. An adaptor according to claim 1, wherein said panel structure of the device comprises juxtaposed laminate chambers provided by translucent partition panels in narrow gap spaced relation, said visual effects producing means comprising respective means for bubbling fluid in the bottoms of said chambers, and said operating means comprising fluid driving apparatus mounted on said supporting platform.

6. An adaptor according to claim 5, wherein said operating means comprise air conducting means having a check valve and an accumulator and the accumulator communicating with said bubbling means.

7. An adaptor according to claim 5, including a manifold communicating with said driving apparatus, said bubbling means having separate tubes effecting communication between said manifold and said separate bubbling means, and means for controlling fluid delivery to each of said bubbling means tubes through said manifold.

8. An adaptor according to claim 7, wherein said manifold has a plurality of branches, said tubes leading from respective ones of the branches to respective ones of the bubbling means, and respective valves for controlling said branches.

9. An adaptor according to claim 5, wherein said bubbling means comprise respective tubes having delivery risers along one side of the chambers with ported bubble manifold sections on the bottoms of the chambers and stabilizing closed end risers at the opposite sides of the chambers, and means for coupling the delivery risers with said operating means.

* * * * *